US007695356B2

(12) United States Patent  
Fujioka et al.

(10) Patent No.: US 7,695,356 B2  
(45) Date of Patent: Apr. 13, 2010

(54) GAME PROGRAM, GAME DEVICE, AND GAME METHOD (75) Inventors: Kenji Fujioka, Tokyo (JP); Naoki Nishikawa, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 437 days.

(21) Appl. No.: 11/685,784

(22) Filed: Mar. 14, 2007

(65) Prior Publication Data

US 2007/0155452 A1 Jul. 5, 2007

Related U.S. Application Data (63) Continuation of application No. PCT/JP2005/016622, filed on Sep. 9, 2005.

(30) Foreign Application Priority Data

Sep. 21, 2004 (JP) ............................... 2004-273573

(51) Int. Cl.  
*A63F 9/24* (2006.01)
(52) U.S. Cl. ................. 463/3; 463/39; 463/43
(58) Field of Classification Search ........................ None  
See application file for complete search history.

(56) References Cited

U.S. PATENT DOCUMENTS 5,435,554 A * 7/1995 Lipson ........................... 463/3

| 6,217,444 | B1 * | 4/2001 | Kataoka et al. | 463/3 |
| 6,270,413 | B1 * | 8/2001 | Aikawa et al. | 463/31 |
| 6,482,090 | B1 | 11/2002 | Rimoto et al. | |
| 7,223,169 | B2 * | 5/2007 | Imaeda et al. | 463/3 |

FOREIGN PATENT DOCUMENTS

| EP | 1 224 960 A1 | 7/2002 |
| JP | 2502473 B | 3/1996 |
| JP | 10-71274 A | 3/1998 |
| JP | 2002-000939 A | 1/2002 |

OTHER PUBLICATIONS

"Jikkyo Powerful Pro-Yakyu Basic Ban 2001 Perfect Guide"; Konami Co., Ltd.; Jun. 2001; 1st edition; pp. 8, 9 and 16-19.

* cited by examiner

Primary Examiner—M. Sager  
(74) Attorney, Agent, or Firm—Global IP Counselors, LLP (57) ABSTRACT With a game implemented by the present game program, ball dispatch origin characters will be displayed on a monitor. In addition, characters corresponding to ball dispatch destinations will be displayed on the monitor. A ball dispatch destination character will be identified when the command means is placed into contact with one of the characters corresponding to the dispatch destinations. If this occurs, a ball character will be dispatched from one of the ball dispatch origin characters to one of the ball dispatch destination characters.

7 Claims, 5 Drawing Sheets

GAME PROGRAM, GAME DEVICE, AND GAME METHOD

CROSS-REFERENCE TO RELATED APPLICATIONS

This application is a continuation application of International Application No. PCT/JP2005/016622 filed on Sep. 9, 2005. The entire disclosures of International Application No. PCT/JP2005/016622 is hereby incorporated herein by reference.

This application claims priority to Japanese Patent Application No. 2004-273573. The entire disclosure of Japanese Patent Application No. 2004-273573 is hereby incorporated herein by reference.

BACKGROUND OF THE INVENTION

1. Field of the Invention

The present invention relates to a game program, and in particular to a game program for causing a computer to implement a game that displays a moveable character on a touch panel type of monitor. In addition, the present invention relates to a game device and a game method that is actualized by this game program.

2. Background Art

Various video games have been proposed in the past. Various video games now allow one to issue various commands to a character displayed on a monitor by operating an input unit that is independent of a game unit, e.g., various input buttons on a controller, or by operating various input buttons that are integrally provided on the game unit. For example, a standard game device has a monitor, a game unit that is separate from the monitor, and a controller that is separate from the game unit. A plurality of input buttons are arranged on the controller. In addition, a portable game device has a game unit, a liquid crystal monitor arranged in the approximate central portion of the game unit, and a plurality of input buttons that are arranged on both sides of the liquid crystal monitor. With this type of game device, various commands can be issued to a character displayed on the monitor by operating at least one of the plurality of input buttons.

Thus, one known video game in which commands to a character are performed from input buttons includes a competitive video game, e.g., a baseball game, in which athlete characters are displayed on a monitor and a competition takes place. With this baseball game, if a player causes the ball to be dispatched to a defender and a fielder character catches the ball, the ball will be dispatched from the fielder character who caught the ball to a selected destination if a button corresponding to the destination of the ball, e.g., home base, first base, second base, or third base is pushed.

With conventional baseball games, when a fielder character has caught a ball, the ball will be dispatched from the fielder character to home base, first base, second base, or third base, if a button corresponding to home base, first base, second base, or third base is pushed. At this point, after confirming the play situation on the monitor, the player must blindly touch the buttons corresponding to each base, e.g., four directional command buttons arranged in a cross shape. Generally, after the fielder character has caught the ball, the player must issue a ball dispatch destination command to the fielder in response to the play situation. Because of this, when the player blindly touches the buttons corresponding to each base, the player may accidentally push a button that is different from the desired button.

In view of the above, it will be apparent to those skilled in the art from this disclosure that there exists a need to make it possible to correctly and easily input a command when dispatching a moving object to a character. This invention addresses this need in the art as well as other needs, which will become apparent to those skilled in the art from this disclosure.

SUMMARY OF THE INVENTION

A game program according to a first aspect of the present invention is a program for implementing the following functions on a computer capable of implementing a game in which a moving object is dispatched from a character displayed on a touch panel type of monitor.

(1) A dispatch origin display function that will display a character dispatch origin of a moving object.

(2) A dispatch destination display function that will display a character corresponding to a dispatch destination of the moving object.

(3) A dispatch destination identification function that will identify a dispatch destination character when command means is placed into contact with the character corresponding to the dispatch destination.

(4) A moving object dispatch function that will dispatch the moving object from the dispatch origin character to the dispatch destination character identified by the dispatch destination identification function.

With a game implemented by this program, a character dispatch origin of the moving object will be displayed on the monitor with the dispatch origin display function. The dispatch destination display function will display at least one character corresponding to a dispatch destination of the moving object on the monitor. The dispatch destination identification function will identify a dispatch destination character when the command means is placed into contact with the character corresponding to the dispatch destination. The moving object dispatch function will dispatch the moving object from the dispatch origin character to the dispatch destination character identified by the dispatch destination identification function.

With this game program, the dispatch destination character will be identified when the command means is placed into contact with a character corresponding to a dispatch destination. At this point, the moving object will be dispatched from the dispatch origin character to the identified dispatch destination character.

For example, consider a case in which a baseball game is implemented on a touch panel type of monitor, and a player causes a defense character to throw the ball. In this case, with the aforementioned program, if the command means is placed into contact with a character corresponding to a dispatch destination, e.g., a character corresponding to home base, first base, second base, or third base, after a fielder character has caught the ball, the home base, first base, second base, or third base character will be identified. At this time, the ball character can be dispatched from the fielder character that caught the ball to the home base, first base, second base, or third base characters. Thus, a player can dispatch the ball character from the fielder character that caught the ball to the home base, first base, second base, or third base characters with a simple operation, in which the command means is placed into contact with a dispatch destination character, e.g., the home base, first base, second base, or third base characters. In this way, the player can accurately and easily input commands for causing the fielder character to dispatch the ball character simply by using the command means.

A game program according to a second aspect of the present invention is the game program of the first aspect, and is a program for implementing the following function in a computer.

(5) A dispatch mode display function that will display at least one character corresponding to a dispatch mode of the moving object on the monitor.

(6) A dispatch mode identification function that will identify the dispatch mode when the command means is placed into contact with the character corresponding to the dispatch mode of the moving object.

With a game implemented by this program, at least one character corresponding to the dispatch mode of the moving object will be displayed on the monitor by the dispatch mode display function. The dispatch mode identification function will identify the dispatch mode when the command means is placed into contact with the character corresponding to the dispatch mode of the moving object. Then, the moving object dispatch function will dispatch the moving object from the dispatch origin character to the dispatch destination character identified by the dispatch destination identification function based upon the discharge mode.

Here, the dispatch mode of the dispatch origin character will be set when the command means is placed into contact with the character corresponding to the dispatch mode. Because of this, in a baseball game for example, if the command means is placed into contact with the character corresponding to the dispatch mode, e.g., a character corresponding to a relay, after a fielder character has caught the ball, a relay command can be set to the fielder character that caught the ball. Then, the player can cause the ball character to be dispatched from the fielder character that caught the ball to the dispatch destination character via a relay character. In this way, the player can accurately and easily input commands for commanding the dispatch mode with respect to a fielder character by simply using the command means.

A game program according to a third aspect of the present invention is the game program according to the first or second aspects, and is a program for implementing the following functions in a computer.

(5) A contact position identification function that will identify the contact position of the command means when the command means is placed into contact with an area of the monitor in which the characters are not displayed.

(6) A dispatch origin character movement function that will cause the dispatch origin character to move toward the contact position.

With a game implemented by this program, the contact position of the command means will be identified with the contact position identification function when the command means is placed into contact with an area of the monitor in which the characters are not displayed. The dispatch origin character will be moved toward the contact position with the dispatch origin character movement function.

Here, the contact position of the command means will be identified, and the dispatch origin character will be moved toward the contact position, when the command means is placed into contact with an area of the monitor in which the characters are not displayed. Because of this, in a baseball game for example, the dispatch origin character can be moved toward the contact position when the contact means is placed into contact with an area of the monitor in which a character is not displayed. In this way, the player can accurately and easily input movement commands with respect to the fielder character by simply using the command means.

A game program according to a fourth aspect of the present invention is the game program of the third aspect, and is a program for implementing the following function in a computer.

(7) A dispatch destination character movement function that will cause the characters corresponding to the dispatch destination and the dispatch mode to move together with the moving dispatch origin character.

With a game implemented by this program, the characters corresponding to the dispatch destination and the dispatch mode can be moved together with the moving dispatch origin character with the dispatch destination character movement function.

Here, the characters corresponding to the dispatch destination and the dispatch mode will be moved together with the moving dispatch origin character. Because of this, in a baseball game for example, a player can cause the ball character to be dispatched from a fielder character that caught the ball to a dispatch destination character such as the home base, first base, second base, or third base character, or the like, even during movement of the dispatch origin character. In addition, a player can cause the ball character to be dispatched from a fielder character that caught the ball to a dispatch destination character such as the home base, first base, second base, or third base character, or the like based upon the dispatch mode, even during movement of the dispatch origin character. In this way, the player can accurately and easily input commands for causing the fielder character to dispatch the ball character during movement.

A game program according to a fifth aspect of the present invention is the game program according to any of the first to fourth aspects, in which the characters corresponding to the dispatch destination and the dispatch mode will be displayed near the dispatch origin character.

Here, characters corresponding to the dispatch destination and the dispatch mode will be displayed near the dispatch origin character. Because of this, in a baseball game for example, a player will be able to easily place the command means into contact with the characters corresponding to the dispatch destination and the dispatch mode. In this way, the player can accurately and more easily input commands for causing a fielder character to dispatch the ball character by simply using the command means.

A game device according to a sixth aspect of the present invention is a game device that can implement a game in which a moving object is dispatched from a character displayed on a touch panel type of monitor. This game device comprises dispatch origin display means, dispatch destination display means, dispatch destination identification means, and moving object dispatch means. The dispatch origin display means will display a dispatch origin character of the moving object on the monitor. The dispatch destination display means will display at least one character corresponding to a dispatch destination of the moving object on the monitor. The dispatch destination identification means will identify a dispatch destination character when the command means is placed into contact with the character corresponding to the dispatch destination. The moving object dispatch means will dispatch the moving object from the dispatch origin character to the dispatch destination character identified by the dispatch destination identification means.

A game method according to a seventh aspect of the present invention is a game method that can implement a game in which a moving object is dispatched from a character displayed on a touch panel type of monitor. A dispatch origin display step will display the dispatch origin character of the moving object on the monitor. The dispatch destination display step will display at least one character corresponding to a dispatch destination of the moving object on the monitor. The dispatch destination identification step will identify the dispatch destination character when the command means is placed into contact with the character corresponding to the dispatch destination. The moving object dispatch step will dispatch the moving object from the dispatch origin character to the dispatch destination character identified by the dispatch destination identification step.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Construction of the Game Device

Figure 1:
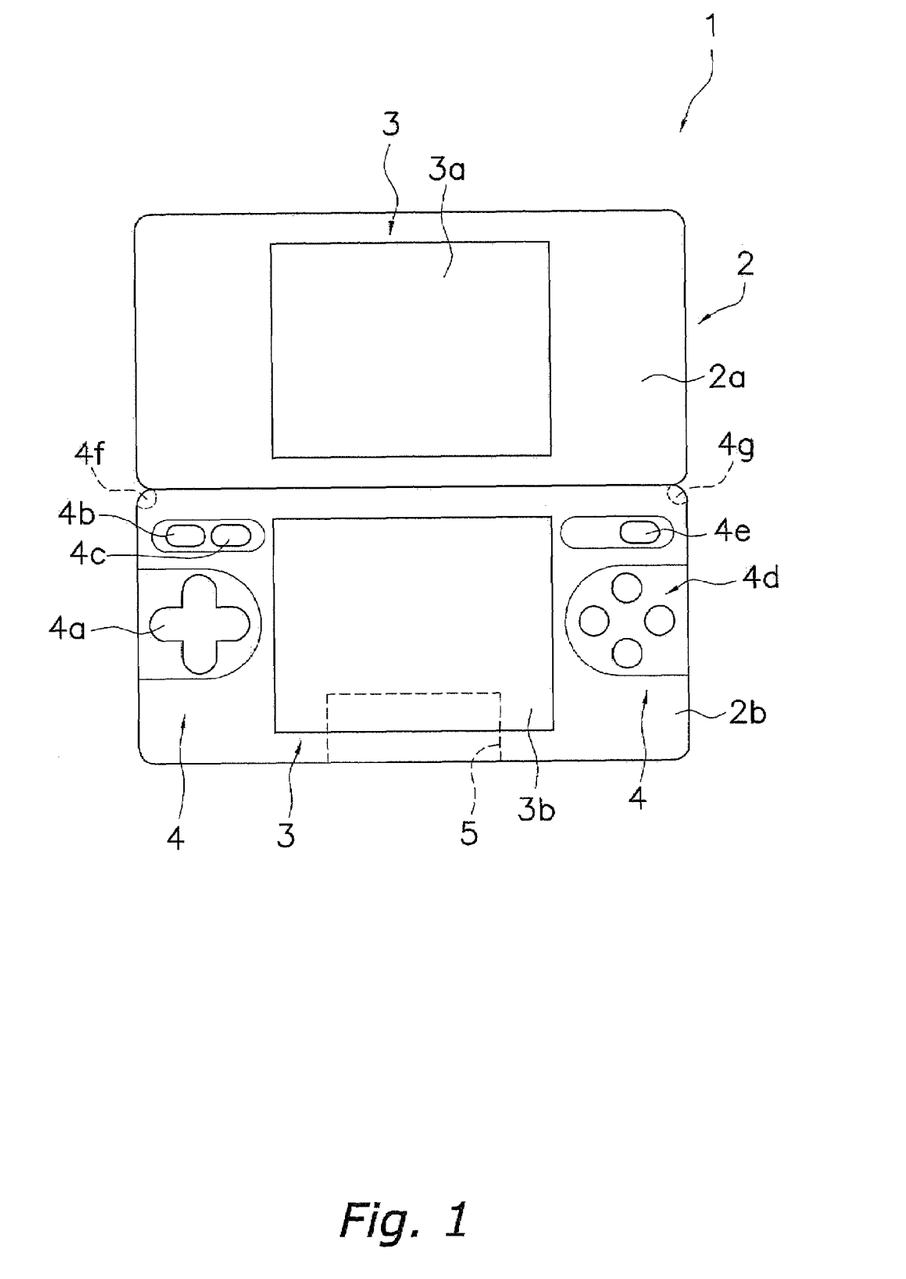
FIG. 1 is an external view of a portable game unit (an example of a computer) that can use a game program according to the present invention.

FIG. 1 is an external view of a portable game unit (an example of a computer) that can use a game program according to the present invention. In addition, FIG. 2 is one example of a control block diagram of the portable game unit.

As shown in FIG. 1, the portable game unit 1 primarily has a main case 2, a liquid crystal monitor unit 3, an input unit 4, a cartridge mounting unit 5, and a communication unit (not shown in the drawings). The main case 2 has an upper case 2a and a lower case 2b. The upper case 2a and the lower case 2b are connected to each other such that they can be opened and closed. The liquid crystal monitor unit 3 comprises an upper liquid crystal monitor 3a provided in the upper case 2a, and a lower liquid crystal monitor 3b provided in the lower case 2b. Here, for example, the upper liquid crystal monitor 3a is a non-touch panel type monitor, and the lower liquid crystal monitor 3b is a touch panel type monitor. The non-touch panel type monitor is comprised of a liquid crystal panel, and the touch panel type monitor is comprised of a liquid crystal panel and a touch panel. On the touch panel type monitor, the display surface of the liquid crystal panel and the data input surface of the touch panel are laminated together so as to be integral with each other. The input unit 4 comprises a cross-shaped directional command button 4a that is arranged on the central portion of the left side of the lower case 2b, a select button 4b and a start button 4c arranged from left to right on the upper portion of the left side of the lower case 2b, command buttons 4d that are arranged in the central portion of the right side of the lower case 2b, a power button 4e that is arranged on the upper portion of the right side of the lower case 2b, and an L button 4f and a R button 4g arranged on the left and right corners of the lower case 2b. The cartridge mounting unit 5 is provided in the lower portion of the lower case 2b. A game cartridge or the like can be mounted in the cartridge mounting unit 5. The communication unit is built into the main case 2, e.g., the lower case 2a. A local wireless network function, internet connection via wireless LAN function, or the like are provided by the communication unit. Note that a sound volume adjustment button, an earphone jack, and the like are provided in the game unit 1, but an explanation on these will be omitted.

Figure 2:
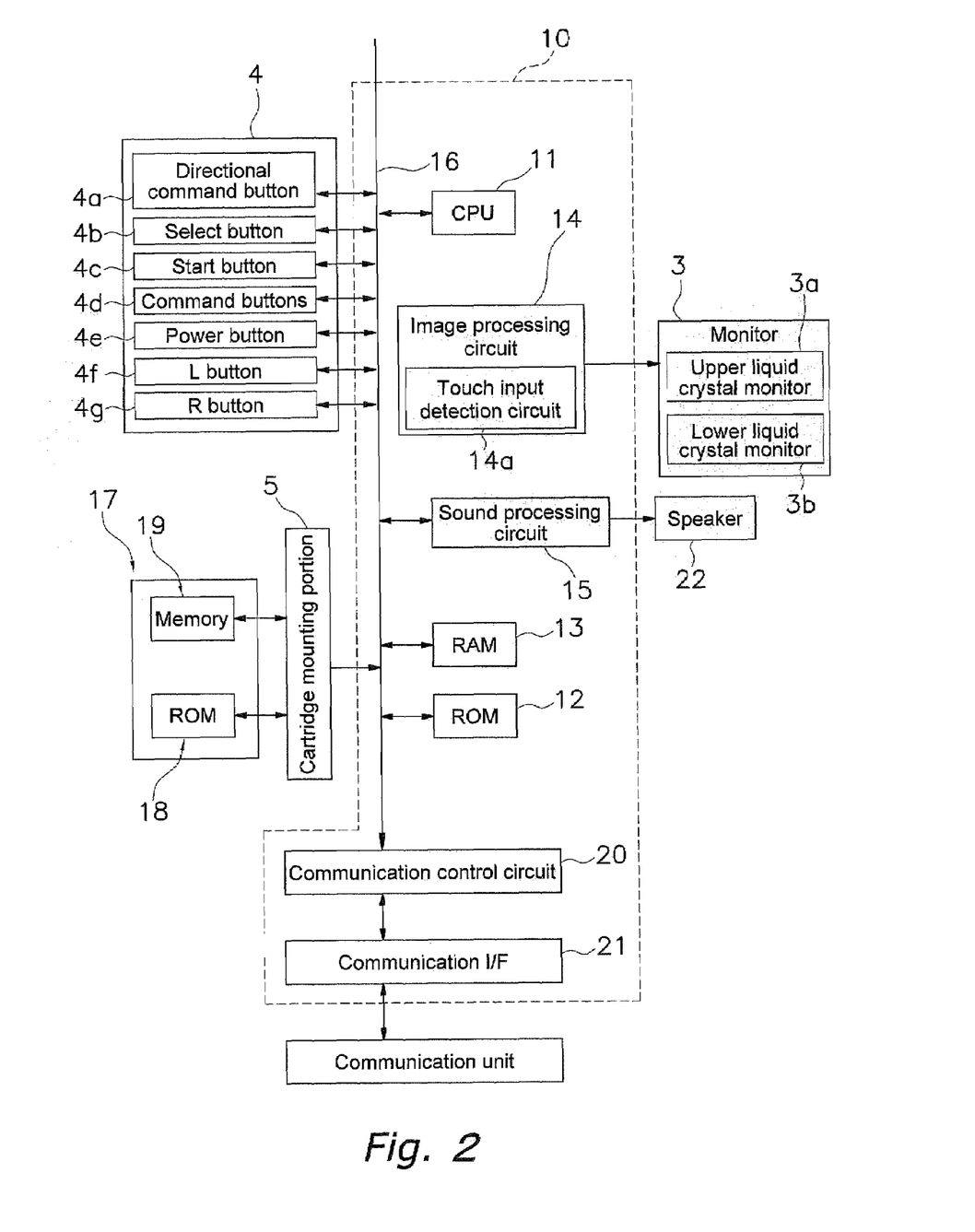
FIG. 2 is an example of a control block diagram of the portable game unit.

As shown in FIG. 2, the portable game unit 1 has a control device 10 in the interior thereof. A CPU (Central Processing Unit) 11 which uses a microprocessor, a ROM (Read Only Memory) 12 as a main storage device, a RAM (Random Access Memory) 13, an image processing circuit 14, a sound processing circuit 15, and a communication control circuit 20 of the control device 10 are connected to each other via a bus 16.

The CPU 11 will interpret instructions from a game program, and will perform various types of data processing and control. The ROM 12 will store programs and the like needed for basic control of the game unit 1 (e.g., start-up control). The RAM 13 will maintain a working area for the CPU 11. The image processing circuit 14 controls the liquid crystal monitor unit 3 in response to rendering commands from the CPU 11, and displays predetermined images on at least one of the upper liquid crystal monitor 3a and the lower liquid crystal monitor 3b. In addition, a touch input detection circuit 14a is included in the image processing circuit 14. When a command means, e.g., a touch pen, a finger, or the like is brought into direct contact with the touch panel, coordinate date of the contact position will be supplied from the touch input detection circuit 14a to the CPU 11, and the contact position will be identified by the CPU 11. In addition, when the command means is brought into direct contact with the touch panel at the position of a target object displayed on the liquid crystal panel, coordinate data of the target object will be supplied from the touch input detection circuit 14a to the CPU 11, and the target object will be identified by the CPU. The sound processing circuit 15 will produce analog audio signals in response to sound generation commands from the CPU 11, and will output the same to a speaker 22. The communication control circuit 20 is included in the communication unit, and is employed in order to wirelessly connect the game unit 1 to another game unit or the like. The communication control circuit 20 is connected to the CPU 11 via the bus 16. In response to instructions from the CPU 11, the communication control circuit 20 will control and dispatch connection signals for connecting the game unit 1 to the internet via a local wireless network or a wireless LAN.

An external storage device 17 that is separate from the control device 11 is connected to the bus 16. For example, the external storage device 17 is a game cartridge that is removably mounted in the main case 2, e.g., the lower case 2b. A ROM 18 as a storage medium, and a memory 19 as a rewriteable user memory, are provided in the interior of the external storage device 17. A game program that causes the game unit 1 to function as a computer, and various types of data needed in the execution of the game program, are stored in advance in the ROM 18. The various types of data include various types of character image data, e.g., various types of panel image data, attribute image data, and the like. Rewriteable memory such as flash memory is used in the memory 19. Saved game data or the like will be stored in the memory 19 in response to need. Note that the storage medium of the external storage device 17 is not limited to a semiconductor memory element, and various other types of storage media may be used, such as a magnetic storage medium, an optical storage medium, a magneto-optical storage medium, or the like. Note also that an interface circuit is interposed between the bus 16 and each element, but illustration of these will be omitted here.

Figure 3:
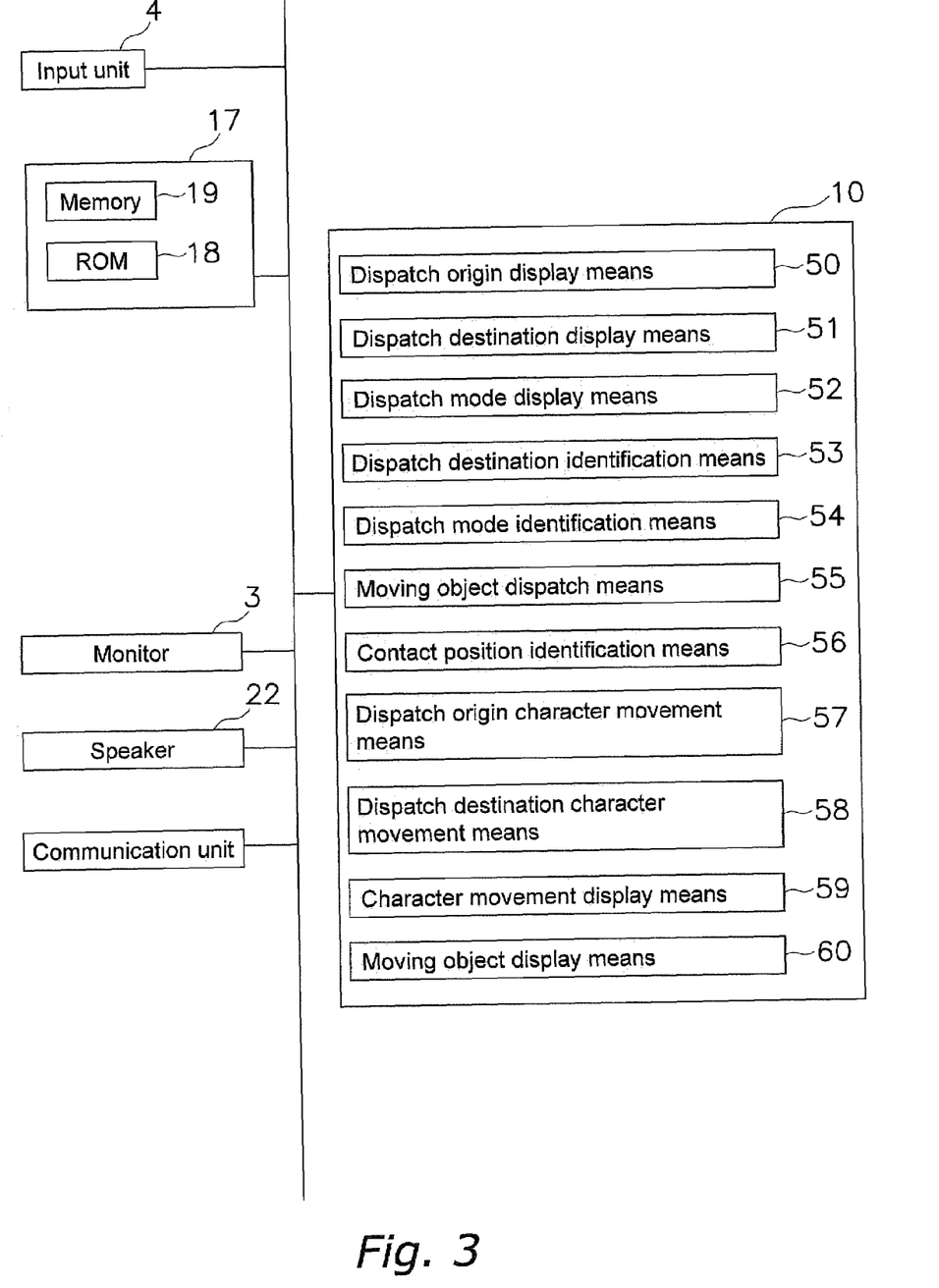
FIG. 3 an example of a function block diagram of the portable game unit.

With the game unit 1 constructed as described above, a player can play various game genres on the liquid crystal monitor unit 3 by loading a game program stored in the ROM 18 of the external storage device 17, and executing the loaded game program with the CPU 11. In addition, by connecting the game unit 1 with another game unit with a wireless network, or connecting the game unit 1 with another game unit via a communication cable or the like, data can be exchanged with another game unit or a competition type game can be played via the communication control circuit 10. Summary of various types of processes in the game device A game that can be executed in the present game unit 1 is, for example, a baseball game. FIG. 3 is a function block diagram for explaining the functions that play an essential role in the present invention.

With the present game unit 1, a moving object will be dispatched from a character displayed on a touch panel type of monitor. The game device 1 primarily comprises dispatch origin display means 50, dispatch destination display means 51, dispatch mode display means 52, dispatch destination identification means 53, dispatch mode identification means 54, moving object dispatch means 55, contact position identification means 56, dispatch origin character movement means 57, dispatch destination character movement means 58, and character movement display means 59.

The dispatch origin display means 50 is implemented by a function that will display a ball dispatch origin character on the monitor. With the dispatch destination display means 50, the ball dispatch origin identified by the CPU 11 will be displayed on the monitor 3, e.g., the lower monitor 3b. More particularly, the ball dispatch origin character will be displayed on the touch panel liquid crystal panel of the lower monitor 3b.

The dispatch destination display means 51 is implemented by a function that will display at least one character corresponding to a dispatch destination of the moving object on the monitor. With the dispatch destination display means 51, at least one character corresponding to a ball dispatch destination stored in the ROM 18 will be displayed on the monitor 3, e.g., the lower monitor 3b. More particularly, characters corresponding to the ball dispatch destinations will be displayed on the touch panel liquid crystal panel of the lower monitor 3b. Here, the characters corresponding to the ball dispatch destinations will be displayed on the monitor 3, e.g., the liquid crystal panel used as a touch panel of the lower monitor 3b, and near the ball dispatch origin character.

The dispatch mode display means 52 is implemented by a function that will display at least one character corresponding to the dispatch mode of the moving object stored in the ROM 18 on the monitor. With the dispatch mode display means 52, at least one character corresponding to the dispatch mode of the moving object will be displayed on the monitor 3, e.g., the lower monitor 3b. More particularly, a character corresponding to the dispatch mode of the moving object will be displayed on the liquid crystal panel used as a touch panel on the lower monitor 3b.

The dispatch destination identification means 53 is implemented by a function that will identify a dispatch destination character when the command means is placed into contact with a character corresponding to a dispatch destination. With the dispatch destination identification means 53, if the command means, e.g., a touch pen, a finger, or the like, is placed into contact with the position of a character corresponding to a dispatch destination displayed on the liquid crystal panel, the coordinate data of the discharge destination character stored in the RAM 13 and read out from the ROM 18 will be referenced by the CPU 11. Then, the coordinate data of the dispatch destination character in the RAM 13 will be identified by the CPU 11, and the dispatch destination character will be identified by the CPU 11.

The dispatch mode identification means 54 is implemented by a function that will identify the dispatch mode when the command means is placed into contact with a character corresponding to the dispatch mode of the moving object. With the dispatch mode identification means 54, if the command means, e.g., a touch pen, a finger, or the like, is placed into contact with the position of the character corresponding to the dispatch mode displayed on the liquid crystal panel, the dispatch mode data of the moving object stored in the RAM 13 and read out from the ROM 18 will be referenced by the CPU 11. Then, the dispatch mode data of the moving object in the RAM 13 will be identified by the CPU 11.

The moving object dispatch means 55 is implemented by a function that will dispatch the moving object from the ball dispatch origin character to the ball dispatch destination character identified by the ball dispatch destination identification function 53. In addition, the moving object dispatch means 55 is implemented by a function that will dispatch the moving object from the ball dispatch origin character to the ball dispatch destination character identified by the ball dispatch destination identification function 53 based upon the dispatch mode. With the moving object dispatch means 55, command signals for causing the ball character to be dispatched from the dispatch origin character identified by the CPU 11 to the discharge destination character identified by the discharge destination identification means 53 will be issued from the CPU 11 to the image processing circuit 14. At this point, based upon the discharge mode data identified by the CPU 11, command signals for causing the ball character to be dispatched from the dispatch origin character to the discharge destination character identified by the discharge mode identification function will be issued from the CPU 11 to the image processing circuit 14.

The contact position identification means 56 is implemented by a function that will identify the contact position of the command means when the command means is placed into contact with an area of the monitor in which the characters corresponding to the discharge destinations are not displayed. With the contact position identification means 56, if the command means, e.g., a touch pen, a finger, or the like, is brought into contact with the liquid crystal panel used as a touch panel on a portion of the touch panel in which the characters corresponding to the dispatch destinations are not displayed, the coordinate data of the contact position of the command means will be supplied from the touch input detection circuit 14a to the CPU 11, and the contact position of the command means will be identified by the CPU 11.

The dispatch origin character movement means 57 is implemented by a function that will cause the dispatch origin character to move toward the contact position. With the dispatch origin character movement means 57, command signals that will cause the dispatch origin character to move will be issued from the CPU 11 to the image processing circuit 14.

The dispatch destination character movement means 58 is implemented by a function that will cause the characters corresponding to the dispatch destinations to move together with the moving dispatch origin character. With the dispatch destination character movement means 58, command signals for causing the characters corresponding to the dispatch destinations displayed on the monitor, e.g., the liquid crystal panel used as a touch panel, to move together with the dispatch origin character displayed on the liquid crystal panel used as a touch panel will be issued from the CPU 11 to the image processing circuit 14.

The character movement display means 59 is implemented by a function that will display the movement state of each of the aforementioned characters on the monitor. With the character movement display means 59, the movement state of each of the aforementioned characters will be displayed on the monitor 3, e.g., the lower monitor 3b, by the image processing circuit 14. More particularly, the movement state of each character will be displayed on the liquid crystal panel used as a touch panel on the lower monitor 3b.

The moving object display means 60 is implemented by a function that will display the movement state of the dispatched ball character on the monitor. With the moving object display means 60, the movement state of the dispatched ball character will be displayed on the monitor 3, e.g., the lower monitor 3b, by the image processing circuit 14. More particularly, the moving state of the dispatched ball character will be displayed on the liquid crystal panel used as a touch panel on the lower monitor 3b.

Summary of the Baseball Game

Next, the specific content of the baseball game of the present embodiment will be explained.

This baseball game primarily comprises a batting system that issues commands with regard to batting to a batter character, a defense system that issues commands with regard to catching and throwing to a fielder character, a pitching system that issues commands with regard to pitching to a pitcher character, and a base running system that issues commands with regard to base running to a base running character. Each of these systems is realized by a game program stored in the ROM 18, for example, and is executed in the game unit 1.

A summary of the pitching system that plays an essential role in the present invention will be explained below.

The defense system allows a defense operation to be performed by commanding a fielder character to dispatch the ball with the command means, e.g., a touch pen, a finger, or the like.

Figure 4:
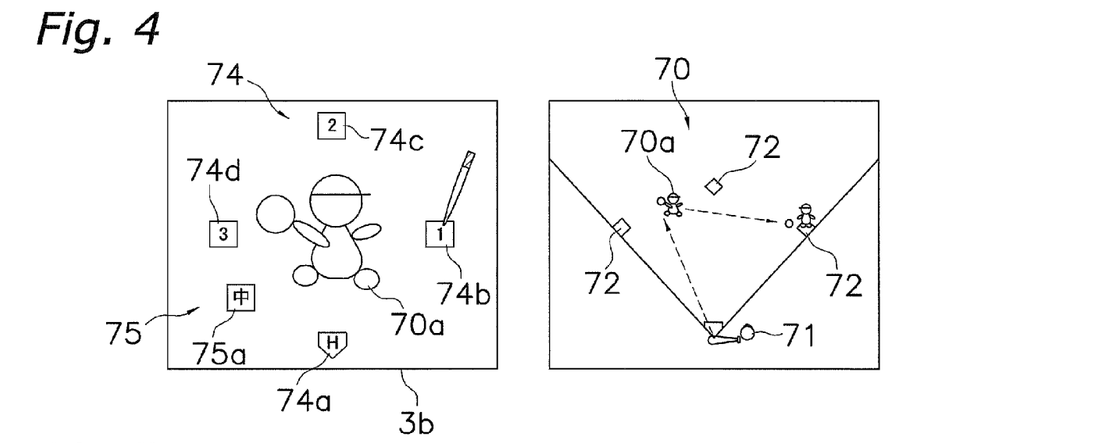
FIG. 4 an explanation of the defense system in a baseball game (dispatch example 1).

With the present baseball game, as shown in FIG. 4, if a player is to operate the defense characters, defense characters 70, a batter character 71, base characters 72, a ball character 73, characters 74 corresponding to ball dispatch destinations, and a character 75 corresponding to the ball dispatch mode, can be displayed on the monitor 3. Here, the defense characters 70 include, for example, a pitcher character, a catcher character, and a plurality of fielder characters. In addition, characters corresponding to ball dispatch destinations include, for example, a character 74a corresponding to home base, a character 74b that corresponds to first base, a character 74c corresponding to second base, and a character 74d corresponding to third base. Furthermore, a character corresponding to the ball dispatch mode includes, for example, a character 75a corresponding to a relay command.

For example, in the event that a player causes the ball character 73 to be dispatched from the pitcher character and the opposing player or an AI (Artificial Intelligence) player causes a batter character 71 to move, then if the ball character 73 hit by the batter character 71 flies to one of the fielder characters of the defense characters 70, the ball character 73 will be caught by one of the fielder characters of the defense characters 70. When this occurs, the one fielder character of the defense characters 70 will be displayed on the lower touch panel type of monitor 3b. Then, the characters corresponding to the dispatch destinations and the character corresponding to the discharge mode will be displayed near, e.g., around the perimeter of, the one fielder character of the defense characters 70.

If the player places the touch pen into contact with a character corresponding to a dispatch destination when the ball character 73 is caught by the one fielder character of the defense characters 70, the dispatch destination character will be selected. When this occurs, the ball character 73 will be dispatched from the dispatch origin character to the dispatch destination character.

For example, as shown in FIG. 4, in the event that the ball character 73 hit by the batter character 71 is caught by the fielder character at shortstop, if the player places the touch pen into contact with the character 74b that corresponds to first base, the first base character will be selected, and the ball character 73 will be dispatched from the fielder character 70a at shortstop to the first base character. This corresponds to a state in a baseball game when the shortstop that caught the ball dispatches the ball to first base.

Figure 5:
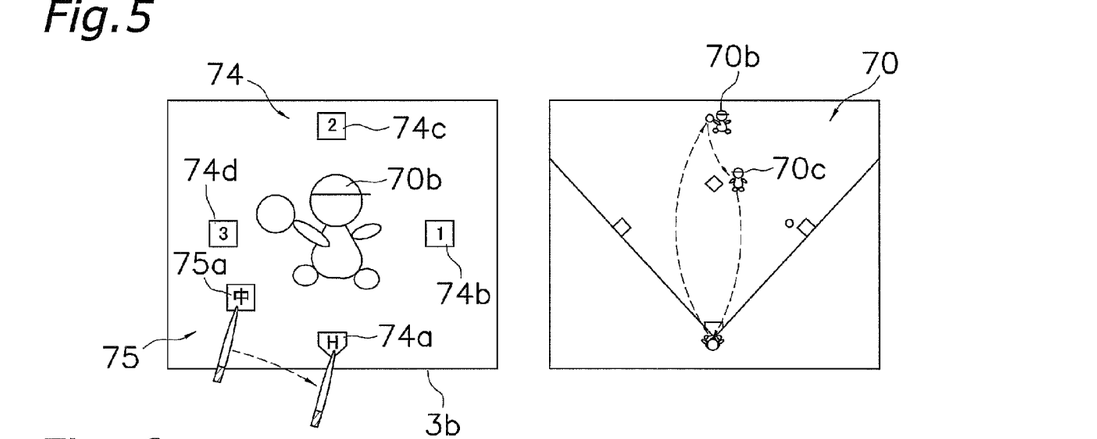
FIG. 5 is an explanation of the defense system in a baseball game (dispatch example 2).

In addition, when one of the fielder characters of the defense characters 70 has caught the ball character 73, the ball dispatch mode will be set if the player places the touch pen into contact with the character corresponding to the ball discharge mode of the fielder character. Then, if the touch pen is placed into contact with a character corresponding to a dispatch destination, the ball character 73 will be dispatched from the dispatch origin character to the dispatch destination character based upon the ball discharge mode.

For example, as shown in FIG. 5, in the event that the ball character 73 hit by the batter character 71 is caught by the fielder character 70b at center field, the fielder character 70b at center field will be placed into a state in which it will receive a relay command if the player places the touch pen into contact with the character 75a that corresponds to the relay command. Then, if the touch pen is placed into contact with the character 74a corresponding to home base, the home base character will be selected. Then, the ball character 73 will be dispatched from the fielder character 70b at center field to the home base character, via a fielder character positioned between the fielder character at center field and the home base character, e.g., the fielder character 70c at second base. This corresponds to a state in which the center fielder that caught the ball dispatches the ball to the second baseman, and the second baseman dispatches the ball to home base. In other words, this corresponds to a situation in which the center fielder dispatches the ball to home base via the second baseman.

Figure 6:
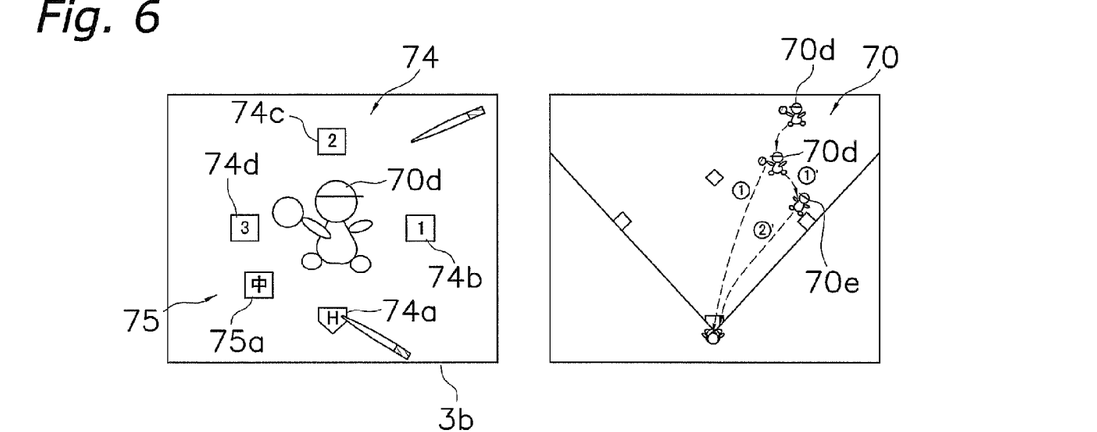
FIG. 6 is an explanation of the defense system in a baseball game (movement and dispatch example 3).

Furthermore, when the ball character 73 has been caught by one of the fielder characters of the defense characters 70, the contact position of the touch pen will be identified if the player places the touch pen into contact with an area of the monitor in which the character corresponding to the dispatch destination is not displayed. When this occurs, the dispatch origin character will move toward the contact position. At this point, both the characters corresponding to the dispatch destinations and the dispatch origin character will move in the direction of the contact position.

For example, as shown in FIG. 6, in the event that the ball character 73 hit by the batter character 71 has been caught by the fielder character in right field, the contact position of the touch pen will be identified when the player places the touch pen between the character corresponding to first base and the character corresponding to second base. When this occurs, the fielder character 70d in right field will move toward the contact position after having caught the ball. At this point, the character 74a corresponding to home base, the characters 74b, 74c, 74d corresponding to first to third bases, and the character 75a corresponding to the relay command displayed around the right field character 70d will move toward the contact position together with the right field character 70d.

Here, if the touch pen is placed into contact with any one of the character 74a corresponding to home base and the characters 74b, 74c, 74d corresponding to first to third bases when the fielder character 70 in right field is moving, the dispatch destination character (the home base character, the first base character, the second base character, or the third base character) will be selected. For example, if the touch pen is placed into contact with the character 74a corresponding to home base, the home base character will be selected. When this occurs, the ball character 73 will be dispatched from the moving right field character 70d to the home base character. In addition, if the touch pen is placed into contact with the character 75a corresponding to the relay command, and the touch pen is placed into contact with the character 74a corresponding to home base, when the fielder character 70d in right field is moving, the ball character 73 will be dispatched from the fielder character 70d in right field to the home base character, via a fielder character positioned between the fielder character 70d in right field and the home base character, e.g., the fielder character 70e at first base.

Each Process Flow During Execution of the Defense System

Figure 7:
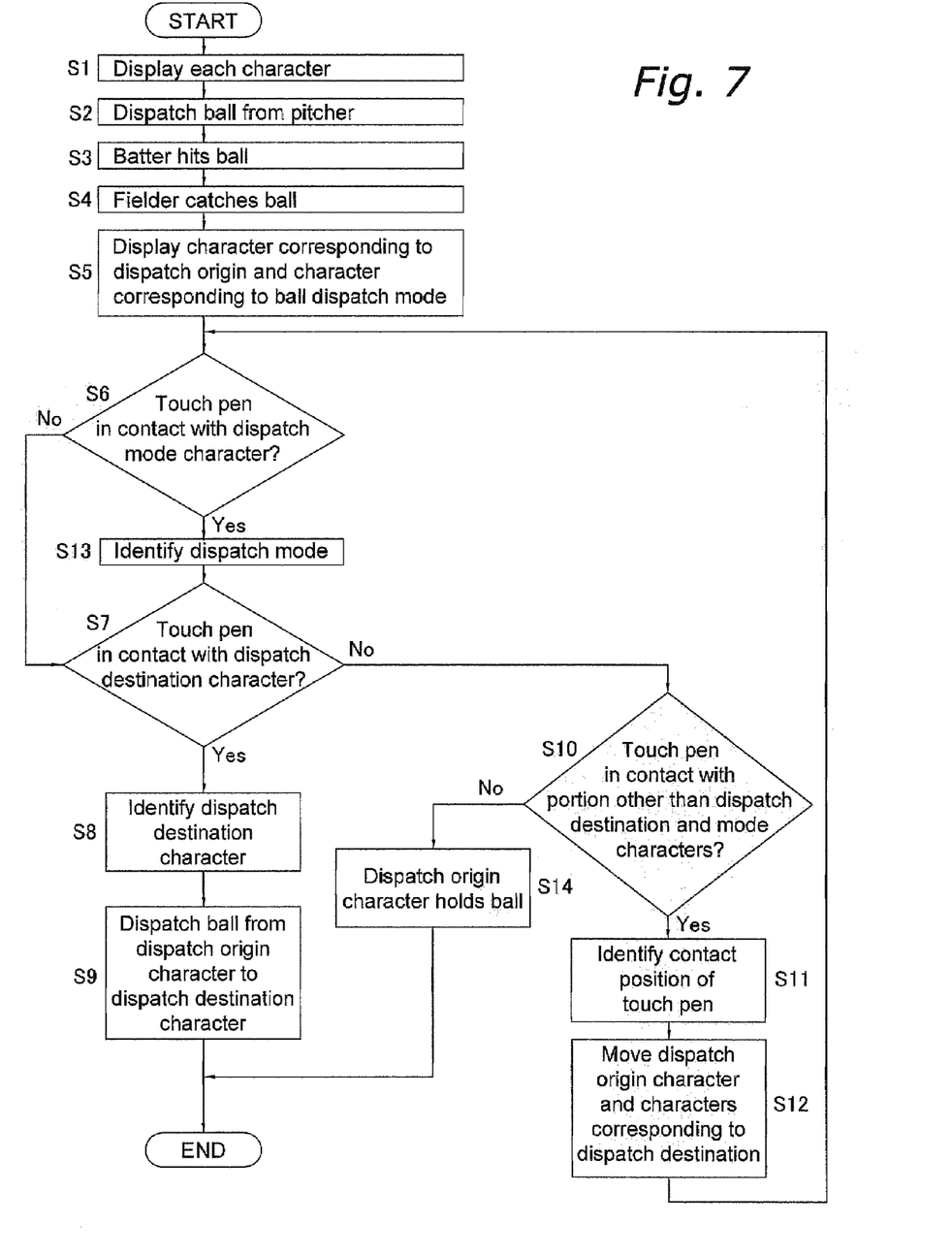
FIG. 7 is a flowchart for explaining the defense system in a baseball game.

The flowchart shown in FIG. 7 will be used to explain the defense system in the baseball game of the present embodiment.

In the event that a player is to operate the defense characters, the defense characters 70, the batter character 71, the base characters 72, and the ball character 73 will be displayed on the lower touch panel type of monitor (S1). Then, the ball character 73 will be dispatched from the pitcher character (S2), and the ball character 73 will be hit by the batter character 71 (S3). Then, the ball character 73 will be caught by one of the fielder characters of the defense characters 70 (S4). When this occurs, the characters corresponding to the dispatch destinations and the character corresponding to the discharge mode will be displayed near, e.g., around, the perimeter of, the one fielder character of the defense characters 70 (S5).

It will be determined whether or not the touch pen is in contact with the character corresponding to the ball relay mode (S6). If it is determined that the touch pen is not in contact with the character corresponding to the ball dispatch mode (S6 is no), it will be determined whether or not the touch pen is in contact with a character corresponding to a dispatch destination (S7). If it is determined that the touch pen is in contact with a character corresponding to a dispatch destination (S7 is yes), the dispatch destination character will be identified (S8). Then, the ball character 73 will be dispatched from the ball dispatch origin character to the ball dispatch destination character (S9).

If it is determined that the touch pen is not in contact with a character corresponding to a dispatch destination (S7 is no), it will be determined whether or not the touch pen is in contact with an area of the monitor in which a character corresponding to a dispatch destination is not displayed (S10). If it is determined that the touch pen is in contact with an area on the monitor in which a character corresponding to a dispatch destination is not displayed (S10 is yes), the contact position of the touch pen will be identified (S11). When this occurs, the dispatch origin character and the characters corresponding to dispatch destinations will move toward the contact position (S12). Then, it will again be determined whether or not the touch pen is in contact with the character corresponding to the ball relay mode (S6). If it is determined that the touch pen is not in contact with an area on the monitor in which a character corresponding to a dispatch destination is not displayed (S10 is no), the state in which the dispatch origin character is holding the ball will be maintained (S14).

If it is determined that the touch pen is in contact with the character corresponding to a dispatch mode (S6 is yes), the dispatch mode will be identified (S13). Then, it will be determined whether or not the touch pen is in contact with a character corresponding to a dispatch destination (S7). Then, steps S7 to S12 will be executed as noted above.

Other Embodiments (a) With the aforementioned embodiment, an example was illustrated in which the portable game unit 1 was used as an example of a computer that can utilize the game program, however the game device is not limited to the aforementioned embodiment, and can also utilize in the same way a game device formed separately from a monitor, a game device for commercial use that is formed integrally with a monitor, and a personal computer, a workstation, or the like that functions as a game device by executing a game program.

(b) The present invention also includes a program and method for executing the game described above, and a computer readable storage medium on which the program is stored. Other than the cartridge, examples of recording media include computer readable flexible disks, semiconductor memory, CD-ROM, DVD, MO, ROM cassettes, and the like.

INDUSTRIAL APPLICABILITY

With this game program, a dispatch destination character will be identified when a command means is placed into contact with a character corresponding to a dispatch destination. At this point, the moving object will be dispatched from the dispatch origin character to an identified dispatch destination character. In this way, a player can dispatch a moving object from the dispatch origin character to the dispatch destination character with a simple operation in which the command means is placed into contact with a character corresponding to a dispatch destination. In this way, a player can accurately and easily input commands that cause a moving object to be dispatched to a character.

What is claimed is:

1. A computer readable medium storing a game program for causing a computer to implement a game in which a moving object is dispatched from a character displayed on a touch panel type of monitor, the game program comprising:
   code for displaying a dispatch origin character which is a dispatch origin of the moving object;
   code for displaying at least one mark corresponding to a dispatch destination of the moving object on the monitor;
   code for identifying a dispatch destination character of the dispatch destination corresponding to the mark by allowing a control unit to recognize a coordinate of the dispatch destination character when input means is placed into contact on the monitor with the mark, and allowing the control unit to recognize the dispatch destination character on the basis of the coordinate, the dispatch destination character being set on a position which is different from the position of the mark; and code for displaying the moving object which moves from the dispatch origin character to the dispatch destination character identified, by allowing the control unit to issue signal to dispatch the moving object.

2. The computer readable medium according to claim 1, the game program further comprising code for displaying at least one character corresponding to a dispatch mode of the moving object on the monitor, and code for causing the control unit to identify the dispatch mode when the input means is placed into contact on the monitor with the mark, the mark corresponding to the dispatch mode of the moving object displayed on the monitor, wherein the code for displaying the moving object includes code for displaying the moving object from the dispatch origin character to the dispatch destination character on the monitor by outputting a moving object dispatch signal for dispatching the moving object from the dispatch origin character to the dispatch destination character on the basis of the dispatch mode identified by the control unit.

3. The computer readable medium according to claim 1, the game program further comprising code for causing the control unit to identify the contact position at which the input means is placed into contact on the monitor and at which the mark is not displayed, and code for causing the control unit to output a dispatch origin character moving signal for moving the dispatch origin character toward the contact position of the input means.

4. The computer readable medium according to claim 3, the game program further comprising code for causing the control unit to output a dispatch destination character moving signal for moving the characters corresponding to the dispatch destination, wherein when the dispatch origin character moving signal and the dispatch destination character moving signal are output by the control unit, the characters corresponding to the destination and the dispatch origin character are displayed on the monitor in moving from the dispatch origin character to the contact position at which the input means is placed into contact.

5. The computer readable medium according to claim 1, wherein code for displaying at least the mark corresponding to a dispatch destination of the moving object includes code for displaying the mark near the dispatch origin character.

6. A game device capable of implementing a game in which a moving object is dispatched from a character displayed on a touch panel type of monitor, comprising:

dispatch origin display means that displays a character dispatch origin of the moving object;

dispatch destination display means that displays at least one mark corresponding to a dispatch destination of the moving object on the monitor;

dispatch destination identification means that identifies a dispatch destination character of the dispatch destination corresponding to the mark by allowing a control unit to recognize a coordinate of the dispatch destination character when the input means is placed into contact on the monitor with the mark, and allowing the control unit to recognize the dispatch destination character on the basis of the coordinate, the dispatch destination character being set on a position which is different from the position of the mark; and moving object displaying means that moves from the dispatch origin character to the dispatch destination character identified, by allowing the control unit to issue signal to dispatch the moving object.

7. A game method capable of implementing a game in which a moving object is dispatched from a character displayed on a touch panel type of monitor, comprising:

a dispatch origin display step that displays a character dispatch origin of the moving object;

a dispatch destination display step that displays at least one mark corresponding to a dispatch destination of the moving object on the monitor;

a dispatch destination identification step that identifies a dispatch destination character of the dispatch destination corresponding to the mark by allowing a control unit to recognize a coordinate of the dispatch destination character when the input means is placed into contact on the monitor with the mark, and allowing the control unit to recognize the dispatch destination character on the basis of the coordinate, the dispatch destination character being set on a position which is different from the position of the mark; and moving object displaying step that moves from the dispatch origin character to the dispatch destination character identified, by allowing the control unit to issue signal to dispatch the moving object.

* * * * *